Oct. 18, 1927.

J. LEDWINKA 1,645,704

APPARATUS FOR ELECTRICAL VULCANIZING

Filed Feb. 3, 1922   2 Sheets-Sheet 1

INVENTOR.
JOSEPH LEDWINKA
BY
ATTORNEY.

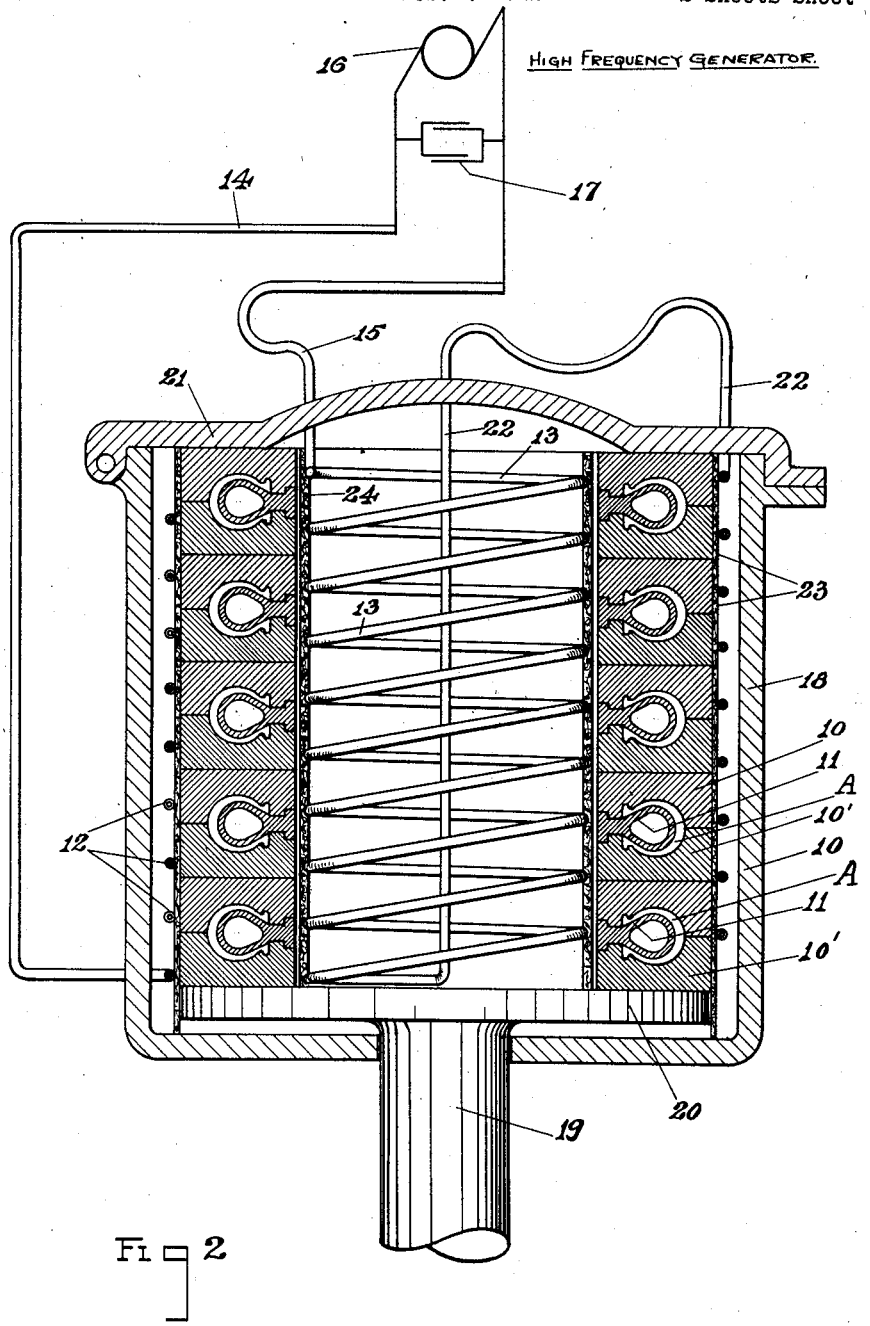

Patented Oct. 18, 1927.

1,645,704

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

APPARATUS FOR ELECTRICAL VULCANIZING.

Application filed February 3, 1922. Serial No. 533,845.

This invention relates to a new and improved method of and apparatus for electrical vulcanizing.

In United States Letters Patent No. 1,348,228, issued August 3rd, 1920, on my application, for method of and means for vulcanizing rubber tires, I have described and claimed an apparatus and method by which the heat necessary for vulcanizing rubber articles, for instance, rubber tires, is supplied by interlinking the annular, metallic mold sections and forming core, by transformer iron, with a primary coil, so that said annular, metallic mold sections and core become closed, single-turn secondaries of a transformer.

These single-turn secondaries being short-circuited upon themselves, an electric current of large volume and low pressure is induced therein and the mold sections and core are raised to a vulcanizing temperature by the heating effect of such induced electric current.

One of the objects of my present invention is to provide means for transforming electrical energy into thermal energy for use in the process of vulcanization, without the necessity of providing any ferro-magnetic linkage between the primary coil and the metallic members or elements in which the heating current is to be induced. Such a means as applied to the heating of metallic masses in crucibles is disclosed by E. F. Northrup in his Patents 1,286,394 and 1,286,395, granted December 3, 1918. Its application to vulcanization, however, constitutes a distinctly new method and apparatus, which latter are distinctly of my own invention.

Another object of my present invention is to provide an apparatus for electrical vulcanizing, in which an electric current is induced in the heating members or elements, without any transformer iron interlinkage between such heating elements and the primary circuit.

The necessity for a transformer iron interlinkage between the primary coil and the heating elements, as proposed in my Letters Patent above referred to, renders it difficult to vulcanize a number of rubber articles, for instance, tires, at one time, and also makes it difficult to secure the necessary pressure for vulcanization. It is one of the objects of my present invention to provide simple and efficient electrical means by which a considerable number of rubber articles, for instance, rubber tires, may be vulcanized simultaneously.

A further object of my invention is to provide means whereby a plurality of rubber articles to be vulcanized may be subjected, simultaneously, to pressure and vulcanizing heat generated by electric currents induced in the molds surrounding the rubber articles by the action of a high frequency electric current.

Another object of my present invention is to provide simple and efficient means for vulcanizing rubber articles, particularly those of annular shape, such as rubber tires.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. My method and apparatus are clearly illustrated in the accompanying drawings, forming a part of this specification, in which:

Fig. 2 is a vertical, sectional view, partly diagrammatic, through an apparatus forming one embodiment of my invention.

In the drawings, the same reference numerals refer to the same parts throughout the several views.

Figure 1:
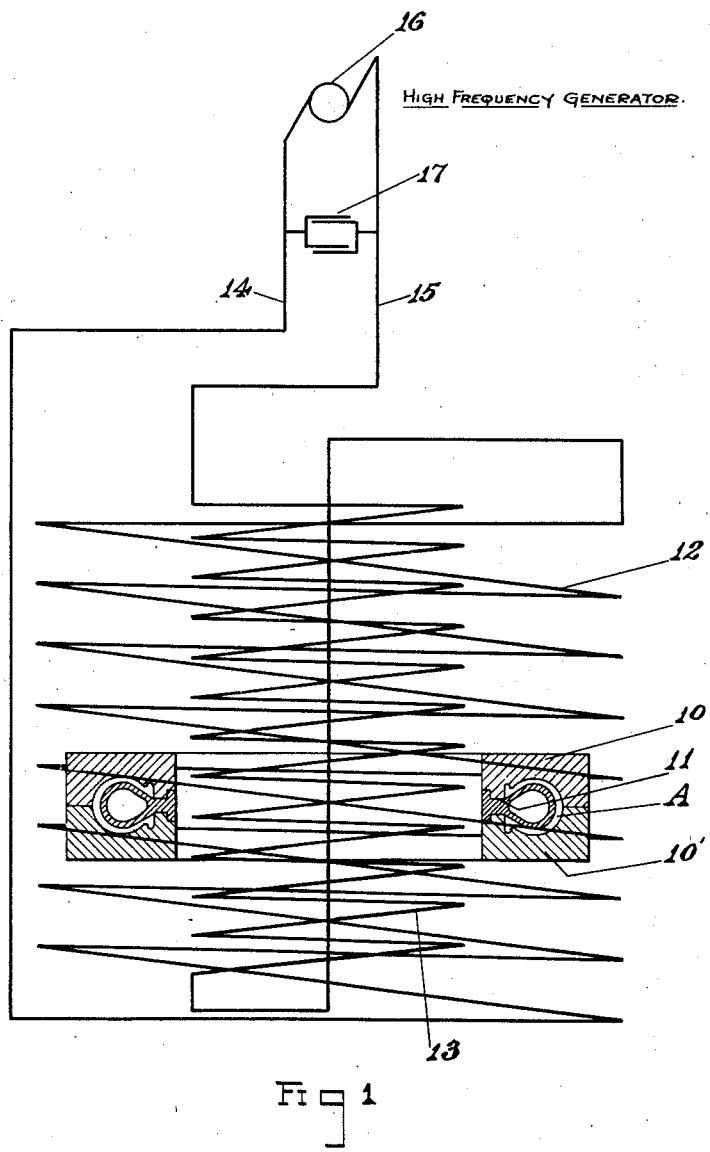
Fig. 1 is a wiring diagram illustrating one embodiment of my invention.

In general, my invention consists in generating vulcanizing heat in heating elements applied to the rubber articles to be vulcanized by subjecting said heating elements, which are electrical conductors, to the field of force of a coil connected in circuit with a source of high frequency electric current, whereby an electric current of high frequency is induced in the heating elements. In the case of rubber tires, the annular mold sections which embrace the rubber tire, and the forming core on which the tire is carried, are metallic, electrically-conducting members and constitute the heating elements. I have found it very desirable and conducive to uniform generation of heat to provide two primary coils, connected in series, one surrounding the stack of annular heating elements and the other positioned within the cylinder formed by such stack of heating elements. According to one method of providing the necessary pressure for vulcanization, I may stack a number of these annular mold sections and forming cores, one upon the other, upon the ram of a hydraulic press, which forces the uppermost mold against a fixed abutment, thereby subjecting all the tires enclosed within said mold sections to great pressure. While this pressure is applied and maintained, the annular mold sections may be subjected to the influence of the field of force of the primary coil, or coils, connected in a high frequency electric circuit, as indicated above.

In Fig. 1 of the drawings, I have illustrated, by means of a wiring diagram, one arrangement embodying my invention and adapted for use in vulcanizing rubber tires. The rubber tire, A, which is to be vulcanized, is carried by the forming core, 11, and enclosed between the annular mold sections, 10 and 10', which may conform with the molds at present used in the vulcanization of rubber tires. Both the mold sections, 10 and 10', and the forming core, 11, are metallic and constitute electrical conductors and, of course, they are annular, conforming in shape to the tire. The mold sections and core constitute heating elements applied to the tire to be vulcanized and, in accordance with my invention, I generate thermal energy in said heating elements, by means of an electric current induced therein without any transformer iron interlinkage between such heating elements and the primary or inducing circuit. As shown in Fig. 1, these annular heating elements, 10, 10' and 11, which entirely surround the rubber tire, A, to be vulcanized, are positioned with an induction coil, 12, which is connected in circuit with a source of high frequency electric current. In this instance, I have also used a second and smaller induction coil 13 which is positioned within the annular heating elements and is also connected in the said circuit. These annular heating elements and the coils are, preferably, arranged coaxially with respect to each other, so that the effect of their fields of force upon the annular heating elements is symmetrical. I have shown the coils, 12 and 13, connected in series with each other and with the leads, 14 and 15, connected to a source of high frequency current, such as the high frequency generator, 16, which may well be a high frequency alternator of the Alexanderson type. A condenser, 17, may be connected across the leads, 14 and 15. In lieu of these circuits, I am using the circuits of the Northrup patents hereinbefore referred to, or any other such circuits feeding the induction coils 12 and 13.

In Fig. 2 of the drawing, I have shown one form of my improved apparatus for vulcanizing rubber tires. This apparatus includes a chamber, 18, within which a plunger, 19, having a head, 20, is movable, preferably, under fluid pressure. A series of mold sections, 10 and 10', embracing tires, A, carried by forming cores, 11, are stacked one upon the other upon the head, 20, of the plunger, 19. The stack molds are in electrically conductive contact with each other, their rectangular sections providing a very extensive area of contact. Moreover, the sections of the molds themselves are in the same effective electrical contact. A cover or cross-member, 21, extends across the upper end of the chamber, 18, and is securely and rigidly fastened so that it constitutes a rigid abutment to resist the pressure exerted by the movable plunger, 19. This cover or cross member, 21, will be engaged by the uppermost mold section and, when pressure is applied to the plunger, 19, the several molds will be clamped and pressed between the cross member, 21, and the head, 20, and the tires, A, will be subjected to considerable pressure. In order to generate vulcanizing heat in the mold sections and forming cores, I have provided the coil, 12, extending around the outside of the several heating elements and between them and the wall of the chamber, 18. One end of this coil is connected to the conductor, 14, forming one lead from the high frequency generator, 16. The other end of the coil, 12, is connected, by the conductor, 22, with one end of the coil, 13, which is positioned within the cylinder formed by the stack of mold sections, and the opposite end of coil, 13, is connected to the conductor, 15, which constitutes the other lead from the high frequency generator, 16.

A stack of mold sections, 10 and 10', with the rubber tires, A, on the forming cores, 11, embraced between the several sections, is piled upon the head, 20, of the ram, 19. The cover or cross member, 21, having been securely clamped in position, pressure is applied to the plunger, 19, so that the several tires are placed under pressure. The electrical circuit including the coils, 12 and 13, is closed and the high frequency current flowing in said circuit induces a high frequency current in the annular mold sections and cores, which is effective to generate a vulcanizing heat therein, so that the tires, A, are simultaneously subjected to vulcanizing heat and pressure. In order to prevent the generation of heat in them, the head, 20, of the plunger, and the walls of the chamber, 18, may be made of some non-conducting material. In order to prevent the conduction of heat from the annular mold sections to the coils, 12 and 13, and the consequent dissipation of the vulcanizing heat generated in said mold sections, a layer of heat insulating material, 23, may be positioned between the coil, 12, and the several mold sections and a similar layer, 24, may be placed between the coil, 13, and said mold sections. After the vulcanization has been completed, the cross member, 21, may be removed and the plunger, 19, moved upwardly by slight pressure applied thereto, the conductors, 15 and 22, being disconnected from the coil, 13. The several mold sections may then be removed, as they are brought to the top of the chamber, 18, by the movement of the plunger. A new stack of mold sections may be placed on the plunger, the latter being lowered while this is done, until the chamber is filled, whereupon the cross member, 21, is clamped in position engaging the uppermost mold section, the conductors, 15 and 22, are connected to the coil, 13, the mold sections are placed under pressure, and the circuit closed, subjecting the new batch of tires to vulcanizing heat and pressure. Instead of disconnecting the conductors, 15 and 22, from the coil, 13, these may be long and flexible enough so that the coil, 13, and the heat insulation, 24, may be lifted vertically from within the stack of mold sections, prior to the removal of the latter from the vulcanizing chamber. Any suitable means may be used to accomplish this.

I have shown one arrangement and disposition for and one method of applying pressure to the articles to be vulcanized but this is merely illustrative and other means may be used to effect this purpose. In some cases, a single coil will be sufficient to generate a vulcanizing heat but, in the case of annular articles, such as rubber tires, I have found that the use of two coils, arranged one within and one without, produces much better results. Any suitable means for generating high frequency electric currents may be used, including not only a high frequency alternator, such as referred to, but also various oscillating current systems for converting low frequency currents into currents of higher frequencies. I have found that very good results are secured by the use of a current having a frequency of approximately 10,000 cycles per second, but I do not intend to restrict my invention to any particular frequency, since I believe that the desired results may be obtained with a considerable range of frequencies.

I am aware that the particular embodiment of my invention, which I have illustrated, is susceptible of considerable variation without departing from the essence thereof and, therefore, I claim my invention broadly, as indicated by the appended claims.

Having thus described my invention, what I claim as new and useful and desire to secure by Letters Patent is:

1. An apparatus for vulcanizing rubber tires comprising a pair of annular mold sections embracing the tire to be vulcanized, a coil surrounding said annular mold sections and a coil surrounded by said annular mold sections, said coils being connected in series with each other and with a source of high frequency electric current, whereby said sections are subjected to the electrostatic field of force generated by said current.

2. An apparatus for vulcanizing rubber tires comprising a pair of annular mold sections embracing the tire to be vulcanized, a coil surrounding said annular mold sections, a second coil surrounded by said annular mold sections, said coils being connected in series with each other and with a source of high frequency electric current, whereby said section are subjected to the electrostatic field of force generated by said current, and heat insulation positioned between said coils and the annular mold sections.

3. An apparatus for vulcanizing rubber tires, comprising an annular mold, an induction coil surrounding the mold, a second induction coil surrounded by the mold, and a high frequency current supply for said induction coils.

4. An apparatus for vulcanizing rubber tires comprising an annular tire mold, an induction coil surrounding said mold and adapted to heat the mold by induced currents when itself traversed by high frequency currents, and a second such coil surrounded by the mold.

5. An apparatus for vulcanizing rubber tires comprising an annular mold of material constituting it a resistor to currents induced in its body, a hollow heating coil juxtaposed the exterior of said mold and free from partial or complete transformer magnetic interlinkage therewith, a second such coil juxtaposed the interior of said mold and means for passing high frequency current through said coils.

6. An electric heating device comprising a hollow induction coil adapted to heating a resistor, a second such hollow induction coil arranged within the hollow of the first and having its turns spaced apart therefrom to provide accommodation for the resistor between the coils and means for passing high frequency current through the coils.

7. An electrical heating apparatus comprising a pair of spaced, concentric induction coils spaced apart a distance sufficient to receive a mass to be heated between them and with respect to which materials so received they are in operative inductive relation, and a high frequency current supply for the induction coil.

8. An apparatus for vulcanizing rubber tires comprising a cylindrical vessel provided with a cover adapted to be clamped in place upon the vessel, a ram arranged at the bottom of the vessel and adapted to exert pressure upwardly against the cover thereof, a hollow induction coil of substantially the form and diameter of the interior of the container and arranged in operative, inductive relation to the space within the container, and a high frequency current supply for said induction coil.

In testimony whereof, I affix my signature.

JOSEPH LEDWINKA.